Figure 1:
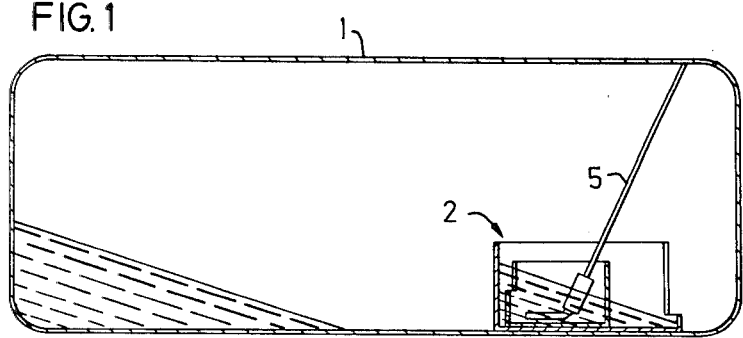

United States Patent [19]  [11] 4,354,521
Harde [45] Oct. 19, 1982

[54] DEVICE IN A FUEL TANK FOR MOTOR VEHICLES
[75] Inventor: Bo T. S. Harde, Gothenburg, Sweden
[73] Assignee: AB Volvo, Gothenburg, Sweden
[21] Appl. No.: 134,475
[22] Filed: Mar. 27, 1980
[30] Foreign Application Priority Data
Apr. 6, 1979 [SE] Sweden .................... 7903083
[51] Int. Cl.³ .......................... F17D 1/00; B65D 1/24
[52] U.S. Cl. .................... 137/571; 137/574; 220/22
[58] Field of Search .............. 220/20, 22; 137/571, 137/574
[56] References Cited
U.S. PATENT DOCUMENTS
958,025  5/1910  Steinmetz ................. 137/574
3,020,950  2/1962  Schraivogel .............. 137/574
3,049,171  8/1962  Neuerburg et al. ........ 137/574
3,552,596  1/1971  Landon ..................... 220/22
4,179,036  12/1979  Pasini ...................... 220/22

Primary Examiner—A. Michael Chambers
Attorney, Agent, or Firm—Young & Thompson

[57] ABSTRACT

A device in a fuel tank for motor vehicles which, if the fuel level is low when driving on an inclined surface, retains a required amount of fuel around the fuel line opening to prevent air intake. Around a container on the tank bottom, into which the fuel line opens, is a larger container, and the two containers have inlets for fuel from the surrounding tank. One container has the inlet in its front side wall and the other container in its rear side wall, as viewed in the longitudinal direction of the vehicle.

9 Claims, 10 Drawing Figures

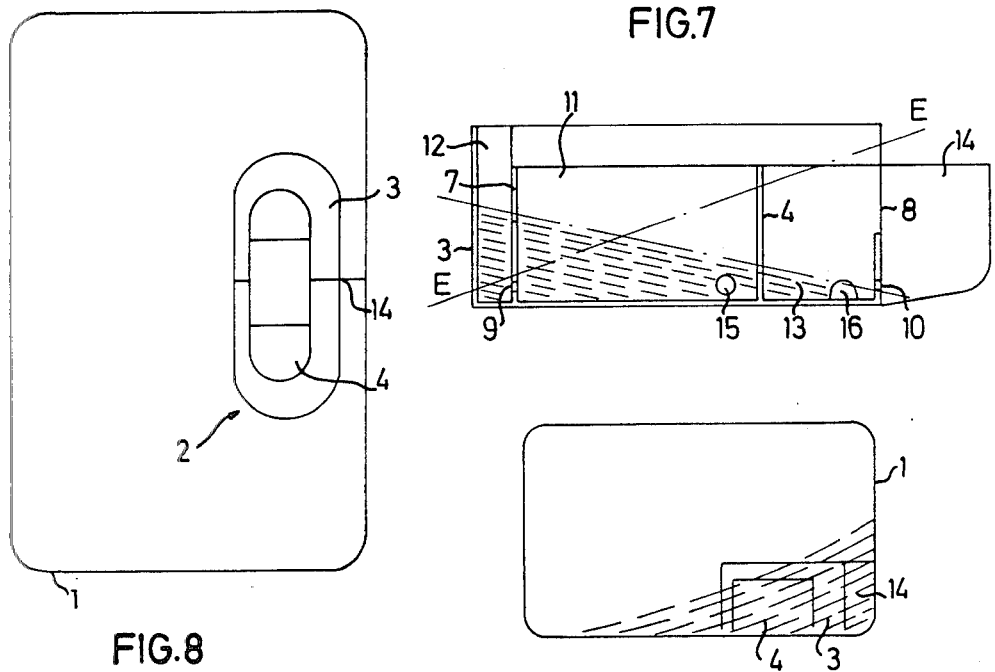
FIG. 7
FIG. 8
FIG. 9
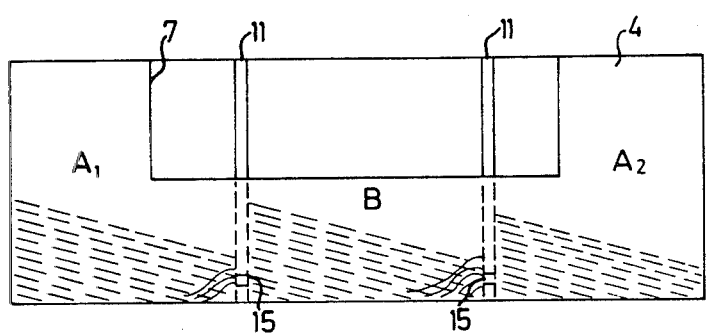
FIG. 10

DEVICE IN A FUEL TANK FOR MOTOR VEHICLES

The present invention relates to a device in a fuel tank for motor vehicles, comprising a container mounted on the bottom of the tank, with an inlet for fuel from the surrounding tank, the suction line to the vehicle fuel pump having an opening in the container in the vicinity of the tank bottom.

A device of this type is designed to retain a required amount of fuel around the opening of the suction line when the fuel level in the tank is low, to prevent the fuel pump from drawing in air when the vehicle is accelerated or decelerated or when driving uphill or downhill, thus preventing the engine from stalling. This is especially important for diesel engines, since engine stalling due to temporary air suction requires that the system be purged of air before the motor can be started again. Thus the need for a device which retains a certain amount of fuel in the area of the opening of the fuel line is especially great in oblong tanks with the major axis oriented along the length of the vehicle.

Different solutions to the above-mentioned problems are known. In the simplest case, the tank is provided with slosh bulkheads designed to dampen the movement of the fuel in the tank. Another variant is a single round container with a small hole in the bottom or fuel inlet. Still another variant is a similar container with flap valves. Common to all of these solutions is that they are not capable of retaining the fuel when the vehicle is parked pointing upwards or downwards on a hill. The two first-mentioned solutions are also ineffective for small amounts of fuel, and the container with flap valves is expensive and complicated.

The purpose of the present invention is to achieve a device of the type described in the introduction, which is simple and inexpensive and which eliminates the disadvantages of said known devices.

This is achieved according to the invention by having a second container with a greater volume than the first-mentioned container surround the first-mentioned container and having both containers be provided with fuel inlets, one container having an inlet in a forwardly directed portion of the container and the other container in a backwardly directed portion along the length of the vehicle.

A device of this type can, without help of moving parts, retain fuel regrdless of the position of the vehicle and regardless of whether it is moving or parked.

Figure 2:
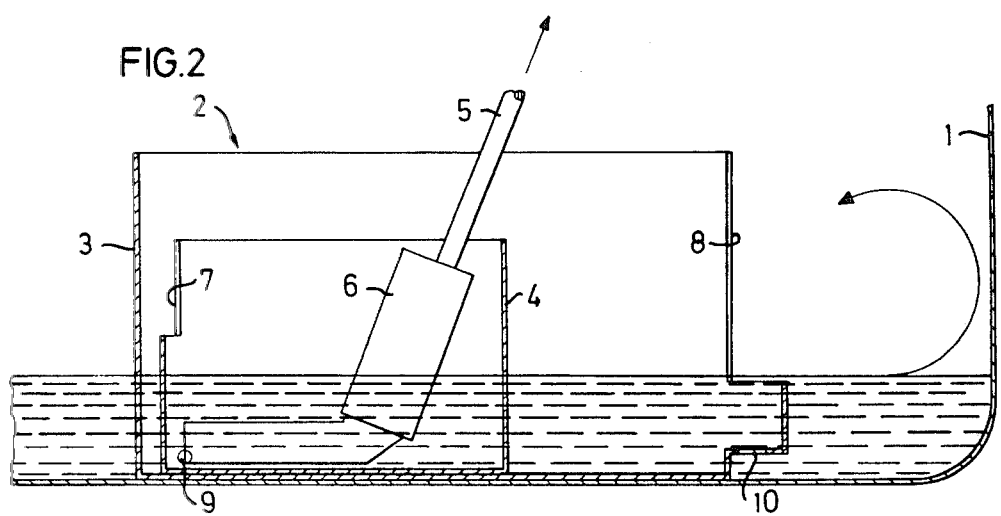
Figure 3:
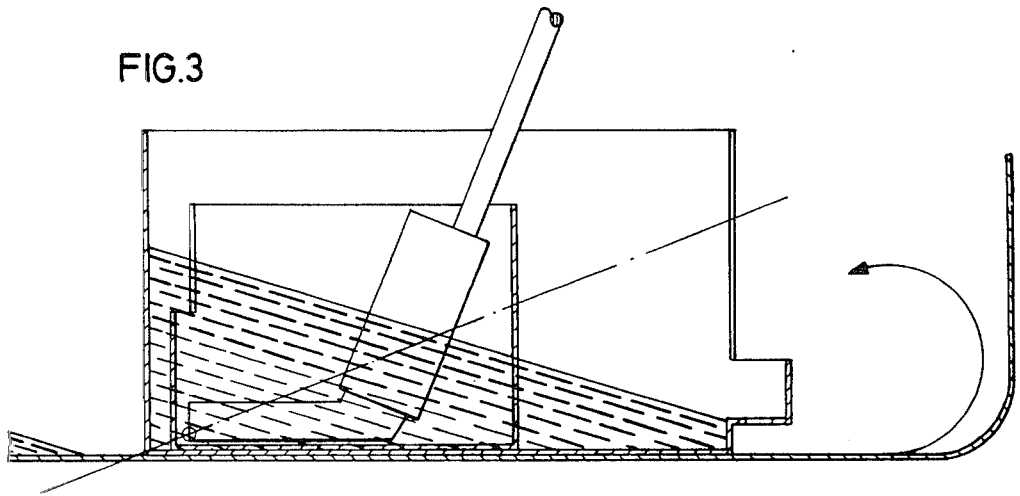
Figure 4:
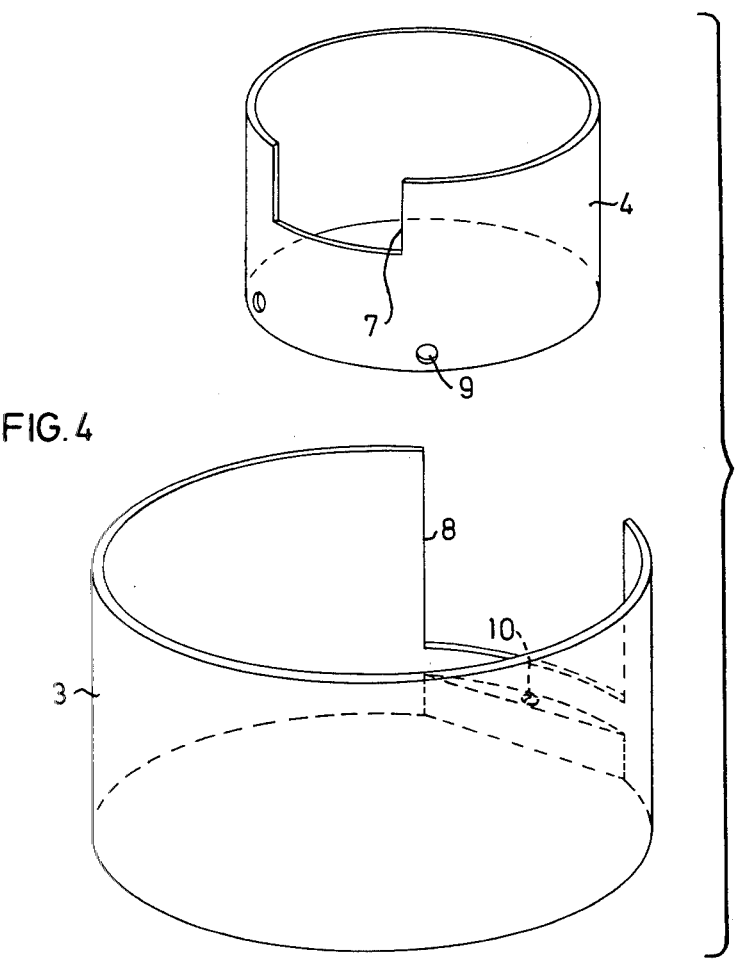
Figure 5:
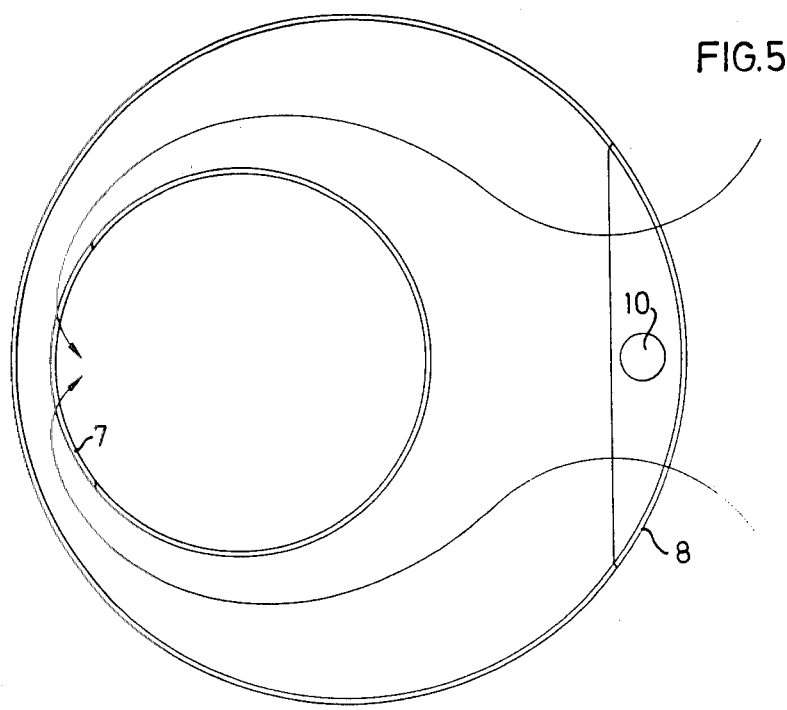
Figure 6:
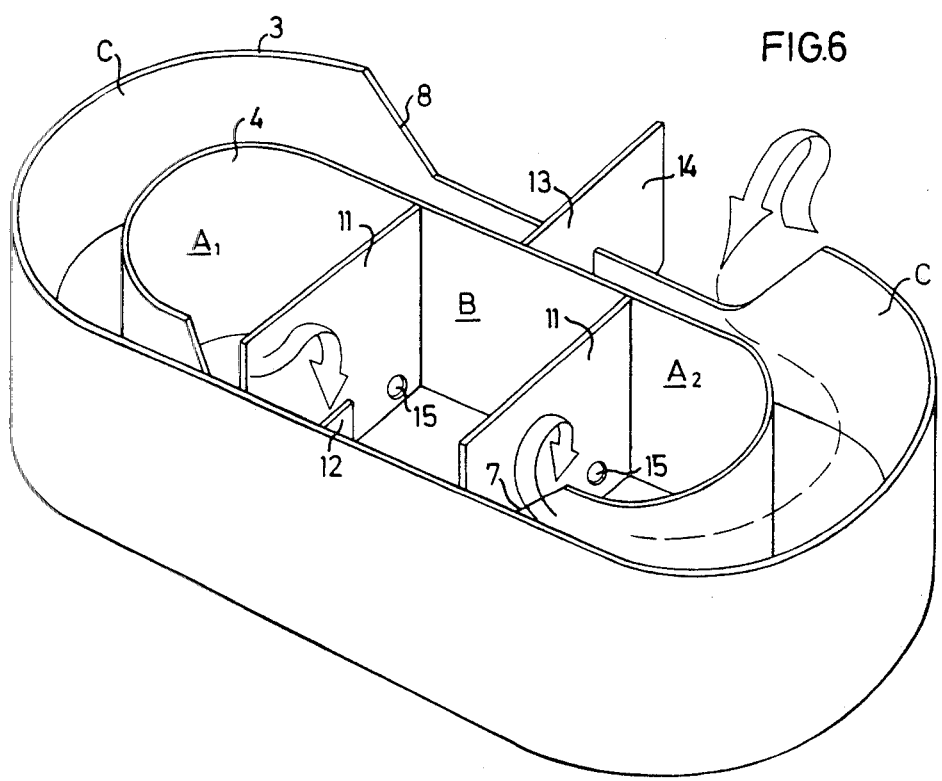

The invention will be described in more detail with reference to the accompanying drawings showing examples, in which FIG. 1 shows a longitudinal section through a schematically illustrated fuel tank with a device according to the invention, FIG. 2 shows the device in FIG. 1 on an enlarged scale, illustrating driving on a level surface, FIG. 3 is a view corresponding to FIG. 2, illustrating driving on an inclined surface, FIG. 4 is an exploded schematic illustration of the device in FIGS. 1-3, FIG. 5 is a view from above of the device in FIGS. 1-4, FIG. 6 is a schematic perspective view of a device according to the invention in a modified embodiment, FIG. 7 shows a longitudinal section through the device in FIG. 6, FIG. 8 shows a horizontal section through a schematically drawn tank with a device according to FIGS. 6 and 7, FIG. 9 shows a longitudinal section through the tank in FIG. 8, and FIG. 10 shows a cross section through the device in FIG. 6.

FIG. 1 shows an oblong fuel tank 1, the right-hand end of which in the drawing is intended to be directed backwards in the vehicle. In the rear portion of the tank 1 a device according to the invention, generally designated 2, is mounted whih comprises two circular containers 3 and 4. In the inner container 4 there is an opening of the suction line 5 to the fuel pump. The end of the line 5 is provided with a filter device 6.

The inner container 4 is placed excentrically in the outer container 3 and has an upwardly open recess 7 in its forward wall, said recess forming a fuel inlet. The outer container 3 has a corresponding recess 8 in its rearwardly directed side wall. The inner container 4 is provided with an additional inlet in the form of two holes 9 located in the vicinity of the container bottom. The outer container 3 is also provided with an additional inlet in the form of a hole 10, in a horizontal container wall. The inlets 9 and 10 are made so as to essentially provide laminar flow into and turbulent flow out of the containers.

When the vehicle is driven or parked on level ground, the fluid assumes the position in the containers 3 and 4 shown in FIG. 2, with filling taking place through the inlet holes 9 and 10. driving on a surface which causes the fuel to slosh back and forth or acceleration produces "immediate filling" of the outer container via the recess 8 by the fuel being pressed up against the rear tank wall and thrown forward, as illustrated with the arrow in FIG. 2. "Immediate filling" of the inner container 4 is obtained in a corresponding manner via the recess 7. This filling is especially effective by the excentric placement of the inner container 4, since the fuel is pressed into a narrowing gap between the container walls, so that the fuel level rises. Due to the fact that the recess 7 of the inner container lies at a higher level than that of the outer container, a pump effect is produced up to said level so that a sufficient volume is retained in the inner container for operation even with a very small amount of fuel.

FIG. 3 illustrates the fuel level when driving downhill or when braking. The inner container receives immediate filling, and the level then slowly sinks when the vehicle is driven on level ground to a successive levelling out. The dash-dot line indicates the fuel level for driving uphill or when accelerating.

It is thus obvious that regardless of the driving situation and regardless of whether the vehicle is parked on an uphill or downhill incline, with the aid of the device according to the invention, it is possible to retain a required amount of fuel around the opening of the fuel line. In tests with a medium-sized passenger car, an outer container 3 with a diameter of about 200 mm and a height of about 100 mm was used and an inner container 4 with a diameter of about 120 mm and a height of about 80 mm, and the fuel provided about 14 km of driving in the position shown in FIGS. 1 and 3.

FIGS. 6-10 show a device according to the invention in a modified embodiment especially intended for fuel tanks which have a longer dimension transversely to the vehicle than longitudinally. The same reference numerals are used for the corresponding parts in the two embodiments.

The device 2 differs from that described above in the first place in that the containers 3 and 4, as well as the tank 1 (see FIG. 8) have a longer dimension transversely to the vehicle than longitudinally, and in that the inner container 4 is divided into three sections $A_1$, B, $A_2$ by means of three separating walls 11. Furthermore, there are separating walls 12 and 13 in the outer container and a separating wall 14 extending from the outer container to the rear tank wall. The walls 12 and 13 divide the outer container into two sections C. In addition to the openings 9 and 10 for fuel inlet when parked or when driving on level ground at a constant velocity, there are openings 15 in the separating walls 11 and an opening 16 in the separating wall 13.

When the vehicle is set in motion forward, the fuel assumes immediately and for a short period the portion shown in FIG. 9. Under the influence of the wave movement, the fuel fills sections C in the outer container 3 and sections $A_1$, B, $A_2$ in the inner container 4 via the recesses 8 and 7. The wave movement in the fuel due to acceleration, braking and turning, produces a higher level in the inner container than in the outer, while driving on level ground results in successive levelling out between the containers.

When braking, before a curve for example, the fuel in setions C is pressed forward and produces an "immediate filling" of sections $A_1$, B, $A_2$ of the inner container (see FIG. 7). When taking the curve, the fuel assumes the position shown in FIG. 10. The holes 15 in the separating walls 11 are constructed to provide laminar flow to section B. Under the influence of centrifugal force, the fuel is pressed from section $A_2$ into section B while transfer of fuel from section B to section $A_1$ is throttled by turbulent flow.

The separating walls 11 prevent fuel from leaving the container 4 during high lateral acceleration, and raise, during this phase, the fuel level in section B in which the opening of the fuel line (not shown) is located. The walls 12 and 13 act as baffles for the wave movement of the fuel across the vehicle.

What I claim is:

1. Device in a fuel tank for motor vehicles, comprising a container mounted on the bottom of the tank, with an inlet for fuel from the surrounding tank, the section line to the vehicle fuel pump having an opening in the container in the vicinity of the tank bottom, characterized in that a second container with a greater volume than the first-mentioned container surrounds the first-mentioned container and that both containers are provided with fuel inlets, one container having an inlet placed in a forwardly directed portion of the container and the other container having an inlet in a backwardly directed portion as viewed along the length of the vehicle, the inner container being offset in the outer container such that the distance between the inlet of the inner container and the opposing wall of the outer container is smaller than the distance between the inlet of the outer container and the opposing wall of the inner container.

2. Device according to claim 1, characterized in that the containers are placed in the rear portion of the fuel tank, relative to the orientation of the vehicle, the outer container having an inlet opening directed towards the rear tank wall and the inner container having an inlet opening which is forwardly directed.

3. Device according to claim 2, characterized in that said inlet openings are arranged with their lower edges at a distance from the tank bottom and that the respective containers each have at least one additional inlet opening, located at a level closer to the tank bottom than the lower edges of said first-mentioned openings, said additional openings having smaller cross sections than the first-mentioned openings.

4. Device according to claim 3, characterized in that the first-mentioned inlet openings are formed of upwardly open recesses in the container walls.

5. Device according to claim 1, characterized in that the inner container is divided, by means of longitudinal separating walls, into a midsection and two side sections and that the separating walls are provided with openings which are made so as to provide essentially laminar flow into and turbulent flow out of the midsection through these openings.

6. Device according to claim 5, characterized in that the outer container is divided by means of longitudinal separating walls into two sections and that at least one wall is provided with an opening.

7. Device according to claim 6, characterized in that the rear one of the separating walls of the outer container has an extension backwards to the rear wall of the tank.

8. Device according to any one of claim 1, characterized in that the containers have circular cross sections.

9. Device according to claim 5, characterized in that the containers have a greater dimension transversely to the vehicle than in the longitudinal direction of the vehicle, the forward and rear wall of the containers being straight while the side walls are arcuate.

* * * * *